US011951442B2

United States Patent
Kim et al.

(10) Patent No.: US 11,951,442 B2
(45) Date of Patent: Apr. 9, 2024

(54) FLAMELESS CATALYTIC THERMAL OXIDATION DEVICE

(71) Applicant: MAT PLUS Co., Ltd., Anseong-si (KR)

(72) Inventors: DongSoo Kim, Anseong-si (KR); ChulHwan Kim, Anseong-si (KR)

(73) Assignee: MAT PLUS Co., Ltd., Anseong-si (KR)

( * ) Notice: Subject to any disclaimer, the term of this patent is extended or adjusted under 35 U.S.C. 154(b) by 0 days.

(21) Appl. No.: 18/137,137

(22) Filed: Apr. 20, 2023

(65) Prior Publication Data

US 2023/0249129 A1    Aug. 10, 2023

Related U.S. Application Data

(63) Continuation of application No. 17/350,182, filed on Jun. 17, 2021, now Pat. No. 11,666,859.

(30) Foreign Application Priority Data

Apr. 22, 2021    (KR) .................. 10-2021-0052115

(51) Int. Cl.
*B01D 53/86*    (2006.01)
*B01D 53/78*    (2006.01)

(52) U.S. Cl.
CPC ......... *B01D 53/8631* (2013.01); *B01D 53/78* (2013.01); *B01D 2255/9032* (2013.01); *B01D 2257/40* (2013.01)

(58) Field of Classification Search
None
See application file for complete search history.

(56) References Cited

FOREIGN PATENT DOCUMENTS

| KR | 1020020001985 A  |   | 1/2002 |
|----|------------------|---|--------|
| KR | 101596873 B1     |   | 2/2016 |
| KR | 101774710 B1     |   | 9/2017 |
| KR | 101946355 B1     |   | 2/2019 |
| KR | 102023950 B1     | * | 9/2019 |
| KR | 102023950 B1     |   | 9/2019 |
| KR | 1020200021235 A  |   | 2/2020 |
| WO | 9934899 A1       |   | 7/1999 |

OTHER PUBLICATIONS

Soo et al. KR102023950B1-translated document (Year: 2019).*
Moon et al., KR20210017903A—original and translated document (Year: 2021).

* cited by examiner

*Primary Examiner* — Jelitza M Perez
(74) *Attorney, Agent, or Firm* — Dinsmore & Shohl LLP; Yongsok Choi, Esq.

(57) ABSTRACT

An object of the present invention is to provide a new frameless catalytic thermal oxidation device capable of treating concentrations of harmful materials including NOx at a low temperature. Further, another object of the present invention is to provide a frameless catalytic thermal oxidation device capable of minimizing the occurrence of THC and minimizing a risk of accidents and environmental pollution which may occur in maintenance operations. According to the objects, the present invention provides a cartridge-type thermal oxidation device capable of being separated for maintenance, wherein a cartridge internal structure is configured so that the time while the material to be treated stays in a zone with the catalyst is increased, and a member capable of dropping and collecting powder generated by thermal oxidation reaction is configured.

3 Claims, 4 Drawing Sheets

FLAMELESS CATALYTIC THERMAL OXIDATION DEVICE

CROSS-REFERENCE TO RELATED APPLICATIONS

This application is a continuation of U.S. patent application Ser. No. 17/350,182 filed on Jun. 17, 2021 which claims priority to Korean Patent Application No. 10-2021-0052115 filed on Apr. 22, 2021, the entire contents of which are herein incorporated by reference.

BACKGROUND

Technical Field

The present invention relates to a thermal oxidation device, and more particularly, to a flameless thermal oxidation device for treating various environmental pollutants generated in refineries, manufacturing processes of semiconductors, LEDs, and displays, etc.

Background Art

As technology of treating environmental pollutants generated in refinery treatment (particularly, heavy oil treatment) of refineries, and manufacturing processes of semiconductors, LEDs, display devices, or panels, there may be a regenerative thermal oxidation method, a catalytic thermal oxidation method, and a flameless thermal oxidation method. An object of these techniques is to completely decompose a material, such as ammonia generated during the process into hydrogen and nitrogen to discharge the material to gas harmless to the environment.

That is, the techniques are intended to combust materials such as toluene, benzene, ethylene, ammonia harmful to the human body to completely combust the materials into carbon dioxide, water vapor, nitrogen, hydrogen, etc. harmless to the human body. Particularly, in the case of nitrogen compounds such as ammonia in the combustion process, only when NOx is not generated, a desired object may be fully achieved, and when NOx is generated, a secondary air pollution problem may be caused.

Among the techniques, the flameless thermal oxidation method has an advantage of having high complete combustion rate and high efficiency against fuel supply, as compared with the catalytic thermal oxidation method.

However, in the case of flameless thermal oxidation devices in the related art, when the flameless thermal oxidation is performed by injecting a reactant containing harmful materials into a reactor, harmful materials such as NOx is generated at a concentration of hundreds of ppm, which is not shown at a very satisfactory level. The cause thereof may include preheating only the inside of the reactor without preheating the reactant, the absence of a catalyst, instability of energy supply due to high-temperature oxidation and degradation of a heater itself, etc.

Further, it is required to minimize the occurrence of total hydrocarbon (THC), and in an FAB using a thermal oxidation device, a risk of accidents and pollution of an internal working environment which may occur at the time of partial replacement, cleaning, etc. of the device should be minimized.

SUMMARY

Technical Problem

Therefore, an object of the present invention is to provide a new flameless catalytic thermal oxidation device capable of treating concentrations of various harmful materials including NOx at a low temperature.

Another object of the present invention is to provide a flameless catalytic thermal oxidation device capable of minimizing the occurrence of THC and minimizing a risk of accidents and environmental pollution which may occur in maintenance operations.

Technical Solution

According to the objects, the present invention provides a cartridge-type thermal oxidation device capable of being separated for maintenance, wherein a cartridge internal structure is configured so that the time while the material to be treated stays in a zone with the catalyst is increased, and a member capable of dropping and collecting powder generated by thermal oxidation reaction is configured.

The present invention provides a cartridge for a thermal oxidation device as a replaceable cartridge included in the thermal oxidation device for treating a material to be treated,
the cartridge comprising:
a chamber-type body;
a cartridge top covering an upper part of the body;
a heater provided in the body;
a catalyst support bottom portion which supports a catalyst to fill the catalyst around the heater;
a passage which is formed between the heater and the catalyst so that the material to be treated may be introduced;
an inlet which is formed on the cartridge top and connected to the passage so that the material to be treated is introduced;
an outlet formed in the cartridge body; and
an impact member connected to the catalyst support bottom portion,
wherein the catalyst support bottom portion is provided with a space from a cartridge bottom portion and has an opening through which the material to be treated may be introduced,
the passage is connected to the space portion so that the material to be treated is introduced into the inlet to pass through the catalyst via the passage and the catalyst and the material to be treated are heated together by the heater to be oxidized and then discharged through the outlet, and
the impact member is a hollow tube member, and includes beads therein and an impact unit of applying the impact to the beads, and the powder present in the cartridge is dropped by movement of the beads.

The thermal oxidation device may further include a heater housing including the heater; and a double housing arranged at a gap from the heater housing wall surface,
the gap between the heater housing wall surface and the double housing wall surface becomes a passage which communicates with the inlet into which the material to be treated is introduced and through which the material to be treated passes, and the material to be treated is introduced to the inlet and preheated through the passage.

Further, the present invention provides
a cartridge for a thermal oxidation device as a replaceable cartridge included in the thermal oxidation device for treating a material to be treated,
the cartridge comprising:
a chamber-type body;
a heater provided in the body;

a catalyst support bottom portion which supports a catalyst to fill the catalyst around the heater;
an inlet into which the material to be treated is introduced;
an outlet formed in the cartridge body; and
an impact member connected to the catalyst support bottom portion,
wherein the catalyst support bottom portion is provided with a space from a cartridge bottom portion and has an opening through which the material to be treated may be introduced,
the inlet starts from the upper part of the body and extends to pass through the catalyst support bottom portion, and the material to be treated descends along the inlet to reach a space below the catalyst support bottom portion and then ascends through the opening of the catalyst support bottom portion, and is heated with the catalyst by the heater to be oxidized and then discharged through the outlet,
the impact member is a hollow tube member, and includes beads therein and an impact unit of applying the impact to the beads, and the powder present in the cartridge is dropped by movement of the beads.

Further, the present invention provides
a cartridge for a thermal oxidation device as a replaceable cartridge included in the thermal oxidation device for treating a material to be treated,
the cartridge comprising:
a chamber-type body;
a heater provided in the body;
a catalyst support bottom portion which supports a catalyst to fill the catalyst around the heater;
an inlet into which the material to be treated is introduced;
an outlet formed in the cartridge body; and
an impact member connected to the catalyst support bottom portion; and
a separation portion which is separated into a first zone without the heater in the body and a second zone including the heater and the catalyst,
wherein the catalyst support bottom portion is provided with a space from a cartridge bottom portion and has an opening through which the material to be treated may be introduced,
an interface between the first zone and the second zone of the separation portion includes an opening,
the inlet starts from the upper part of the body and extends to pass through the catalyst support bottom portion, and the material to be treated descends along the inlet to reach a space below the catalyst support bottom portion and then ascends through the opening of the catalyst support bottom portion, wherein the generated powder is dropped by ascending to the first zone forming an empty space and is introduced into the second zone, and then the material to be treated is heated with the catalyst by the heater to be oxidized and then discharged through the outlet.

The impact member may be a hollow tube member, and include beads therein and an impact unit of applying the impact to the beads, and the powder present in the cartridge is dropped by movement of the beads.

The present invention provides a thermal oxidation device comprising: the cartridge;
a first exhaust connected to an outlet of the cartridge;
a wet tank which communicates with the first exhaust; and
a second exhaust connected to the wet tank,
wherein the first exhaust and the second exhaust are formed in pipes and include one or more nozzles in the pipe to perform a wet process.

The thermal entire cartridge used may be replaced with a new cartridge.

The material to be treated may be treated at a temperature of 600° C. to 800° C.

Advantageous Effects

According to the new flameless catalytic thermal oxidation device of the present invention, it is possible to greatly lower the concentration of harmful materials such as NOx, etc. to only a few of ppm level.

Further, it is possible to provide a heater applied to the flameless catalytic thermal oxidation device as a high-temperature anti-oxidation structure and provide a cartridge structure capable of being easily disassembled when needed.

Further, it is possible to provide a flameless catalytic thermal oxidation device capable of minimizing the occurrence of THC and minimizing a risk of accidents and environmental pollution which may occur in maintenance operations.

Further, according to the present invention, it is possible to efficiently drop and collect powder which has been included in a material to be treated or generated by thermal oxidation reaction by the impact member and prevent clogging of pipes or pollution of the surrounding environment due to the powder.

Further, according to the present invention, while the material to be treated passes through the same path as ascending after descending and lateral progression, the time to stay in the reactor with the catalyst and the heater is increased, and as a result, at a temperature of 600 to 800° C. which is a relatively low temperature, the thermal oxidation reaction is in progress, and despite the low temperature, the concentration of pollutants in the emission can be made very low.

As described above, the descending path of the material to be treated passes around the heater to obtain a preheating effect, thereby promoting the thermal oxidation reaction.

Further, the thermal oxidation occurs at the relative low temperature to prevent high-temperature oxidation of the heater, thereby increasing the life of the heater.

DETAILED DESCRIPTION OF DRAWINGS

Hereinafter, preferred embodiments of the present invention will be described in detail with reference to the accompanying drawings.

Figure 1:
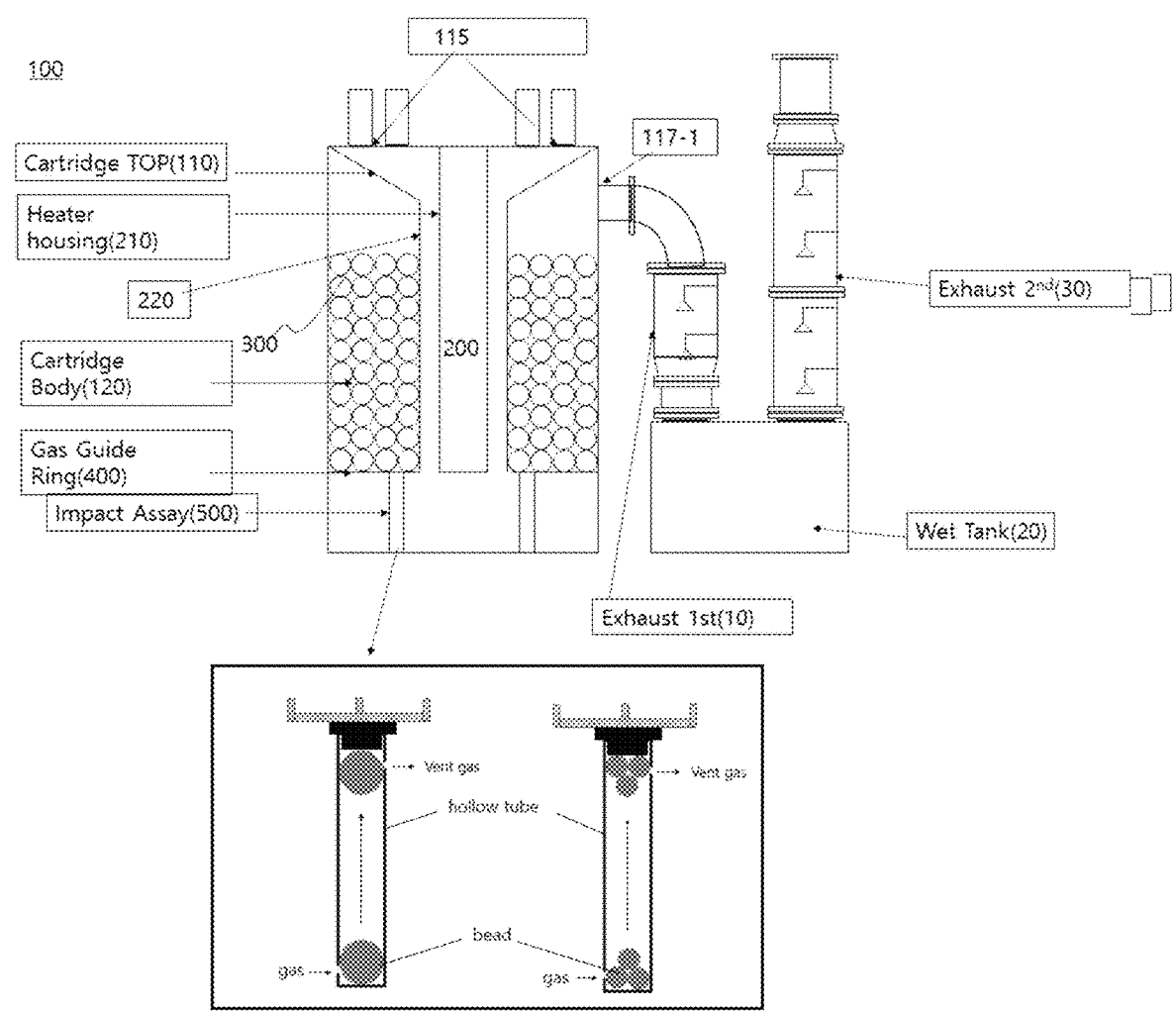
FIG. 1 is a schematic diagram schematically showing a configuration of a thermal oxidation device of the present invention and a treatment order of a material to be treated.

FIG. 1 shows a configuration of a flameless thermal oxidation device of the present invention and a path of a material to be treated according to the configuration. In a device configured in a cartridge 100 form, a heater 200 is installed therein and a catalyst 300 is filled around the heater. The upper part of the cartridge is assembled with a cartridge top 110 consisting of one or more inlets 115 where the material to be treated starts to be introduced. The material to be treated is introduced into the cartridge through the inlets 115 and flows along a passage formed around the heater 200 to be dispersed to a place where the catalyst is present. The catalyst and the material to be treated are heated together by the heater and oxidized. In a cartridge body 120, an outlet 117-1 is formed, so that a reaction product subjected to the oxidation reaction is discharged through the outlet 117-1. The outlet 117-1 is connected with a first exhaust 10, and the first exhaust 10 is connected to a wet tank 20. In the wet tank, a second exhaust 30 as another exhaust is connected, and then the reaction product of the material to be treated is discharged outside through the second exhaust through the first exhaust and the wet tank. The first exhaust 10 and the second exhaust 30 are provided with one or more liquid injection nozzles inside the pipe to wet-treat the reaction product.

It is preferred that a plurality of inlets 115 of the cartridge top 110 is configured, and since the heater is placed at the center of the cartridge, it is preferred that the inlets are arranged radially around the heater. The cartridge top 110 reaches a wall of a heater double housing through a plate support to be assembled with the inlets 115 in the nozzle form and a conical connection portion extending downward thereof.

A heater housing 210 is located at the center of the cartridge reactor (a part limited to a cartridge wall and a catalyst support bottom portion and filled with the catalyst) and fixed and extended to the cartridge top. In the heater housing, the heater extends from the top to the inside of the heater housing, and in the embodiment, the heater extends downward, but extends horizontally when the cartridge is geometrically leveled. The heater housing 210 includes a double housing 220 and is installed at a distance from the inner wall. A space between the wall and the double housing of the heater housing communicates with the inlets 115 to become a moving passage of the material to be treated. The material to be treated may be heated on a moving path by the heater immediately upon introduction.

The catalyst 300 is filled in a space surrounding the heater housing and the bottom portion of the catalyst filling space is spaced apart from the cartridge bottom portion as the catalyst support bottom portion. The catalyst support bottom portion has an opening through the material to be treated may pass and may have a net type. In the embodiment, the catalyst support bottom portion is formed so that a plurality of rings 400 are arranged at intervals around the heater housing bottom portion and fixed with a fixing member. The catalyst support bottom portion is supported by an impact member 500 and the impact member 500 is in contact with the cartridge bottom portion and supported. The impact member 500 consists of a hollow tube, and includes a plurality of beads therein and an impact unit capable of applying the impact to the beads. The impact applied to the beads causes the movement of the beads to drop powder generated in the reactor filled with the catalyst. The powder attached to the catalyst or attached to the member, such as the ring 400, is dropped by the impact member to prevent the efficiency of the reaction from being lowered. The impact unit is a hydraulic type, and preferably, the momentum is applied to the beads by using a gas pressure.

The gap formed between the rings 400 become a passage through which the material to be treated may be introduced toward the catalyst, and the rings serve as a path guide for the material to be treated.

As described above, the cartridge top 110 portion is configured in a cover form of covering a chamber which is the cartridge body.

The flameless thermal oxidation device may treat the material to be treated at a temperature of 600 to 800° C. to minimize the generation of NOx. In the material to be treated, $NF_3$, and VOC may be included.

Since the flameless thermal oxidation device of the present invention uses energy stored by heating the catalyst with the heater without using LNG, nitrogen oxides (thermal NOx) due to heat is rarely generated by operating equipment at 1000° C. or less.

In addition, the generation of total hydrocarbon (THC) is also minimized.

In addition, an effect of treating a hydrocarbon (CxHy) compound is very excellent without using LNG.

The cartridge-type device as above may swap-replace the cartridge itself if necessary. That is, when various maintenance operations such as the addition or replacement of the catalyst, the replacement or repair of the heater, internal cleaning, etc. are to be performed, a new cartridge to be prepared is swap-replaced with the old cartridge at a FAB and then the old cartridge is transferred to a separate place and dissembled and then maintained. This cartridge replacement method minimizes a risk of accidents due to operations in the FAB. In addition, there is little concern about environmental pollution in the FAB by only the operation of replacing the cartridge itself without the whole maintenance in the FAB. That is, the environmental pollution problem caused due to a residual gas leakage risk and dust generated as the process such as cleaning is performed is solved by opening the chamber in a line of the FAB in the related art.

Figure 2:
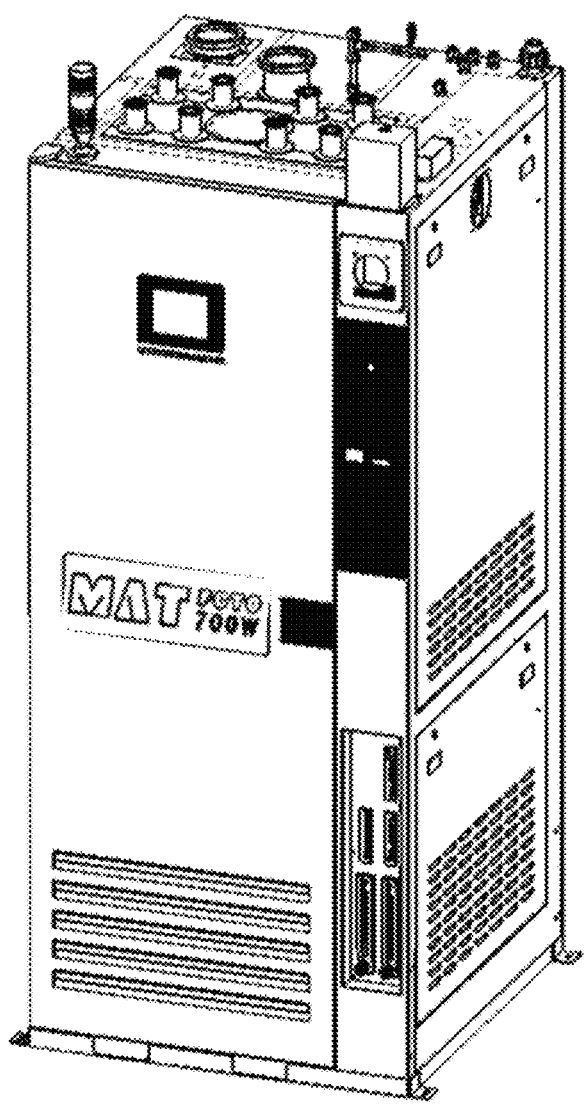
FIG. 2 is a perspective view showing an appearance of the thermal oxidation device of the present invention.

FIG. 2 shows an appearance of the entire flameless thermal oxidation device according to the present invention. The flameless thermal oxidation device is built into a cabinet and various operation control devices are installed on the cabinet to add convenience and safety in use.

Figure 3:
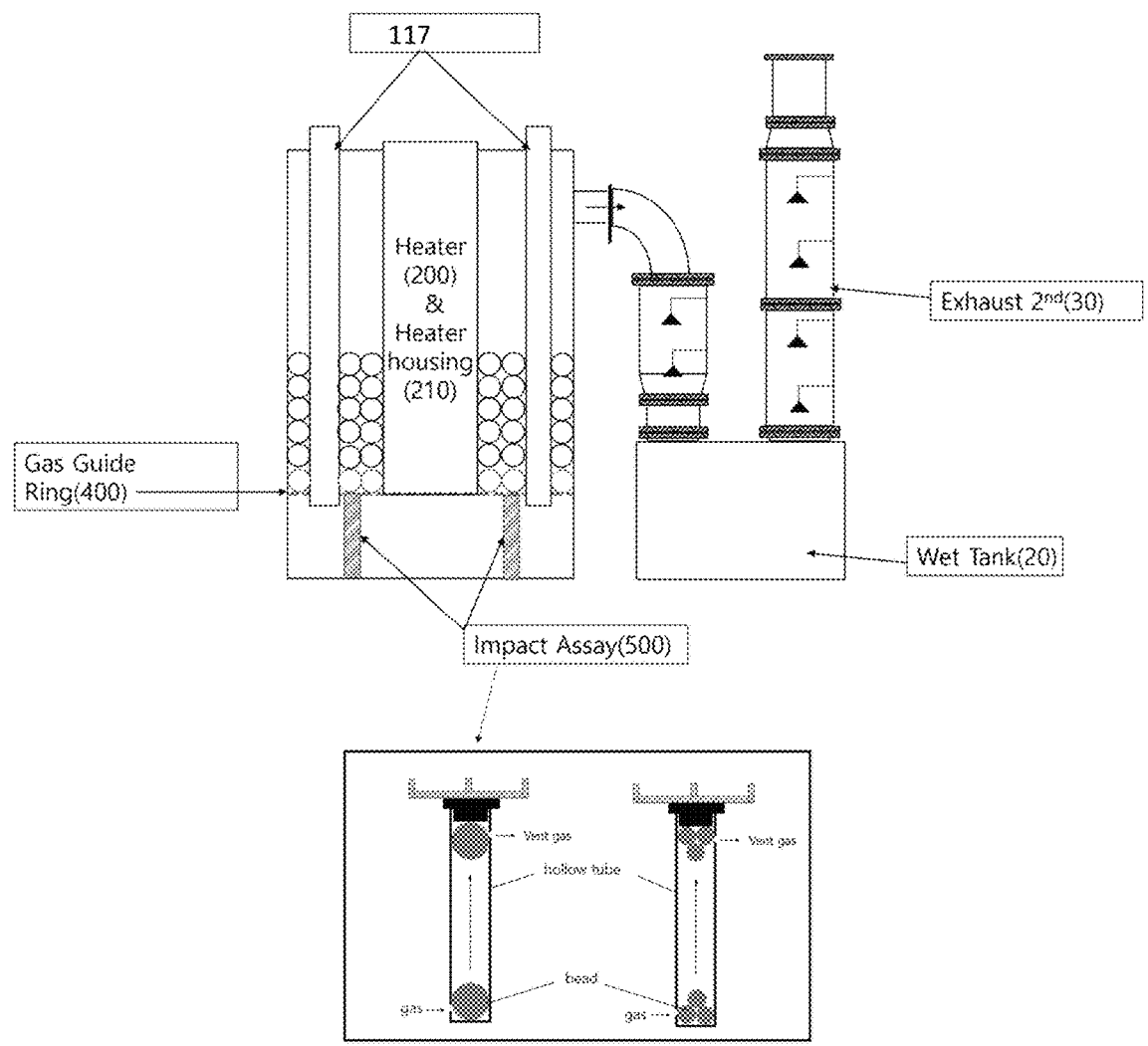
FIG. 3 is a cross-sectional view showing a modification of the thermal oxidation device of the present invention.

FIG. 3 shows a modification of the flameless thermal oxidation device according to the present invention.

The flameless thermal oxidation device of the embodiment is formed in a replaceable cartridge 100, and an inlet 117 to which the material to be treated is introduced extends to arrive near the bottom of a chamber, which is the cartridge body and a heater 200 is installed at the center with respect to the plurality of inlets 117. A separate separation portion (a conical portion of FIG. 1) for separating the introduced material to be treated (before oxidation) and the thermally oxidized material to be treated is not installed. A connection portion connected with a wet scrubber is formed on a chamber outer wall, and preferably, formed at the top higher than the middle of the height of the chamber. A catalyst support bottom portion including a gas guide ring 400 capable of supporting the catalyst is installed at a position higher than the chamber bottom, and a plurality of ring members are coaxially arranged at different intervals, installed in net-type members, or may be installed in plate members with pores. A plurality of impact members 500 is installed below the catalyst support bottom portion and applies the impact to the catalyst support bottom portion to drop powder generated by oxidation. A catalyst 300 is filled inside the chamber corresponding to a spare except for the heater.

In the embodiment, after the material to be treated which is introduced to the inlet 117 elongated descends to the lower part of the chamber, the material to be treated ascends to the place with the catalyst 300 through the pores of the catalyst support bottom portion to be heated and oxidized by the heater 200. The introduced material to be treated descends along the long inlet and is preheated by the heater, ascends and is heated to be oxidized by the action of the catalyst. At this time, heat exchange with a new material to be treated introduced from the inlet 117 is performed so that the newly introduced material reduces the preheating effect and the oxidized material may reduce the thermal load, and as a result, the thermal load transferred to the wet scrubber is reduced. That is, the air-cooled heat exchange action reduces the temperature load of the wet scrubber, and since the material to be treated descends up to the chamber bottom and then ascends and passes through a catalyst zone, the path is elongated to ensure the residence time in the reactor, thereby performing a stable treatment for the flow rate load.

Further, the impact member 500 impacts the catalyst support bottom portion to allow the generated powder to be dropped and collected through the pores of the catalyst support bottom portion. To this end, the impact member may periodically impact the catalyst support bottom portion. The impact member is a hollow tube member, and includes beads therein and an impact unit of applying the impact to the beads, and the powder present in the cartridge is dropped by movement of the beads.

Figure 4:
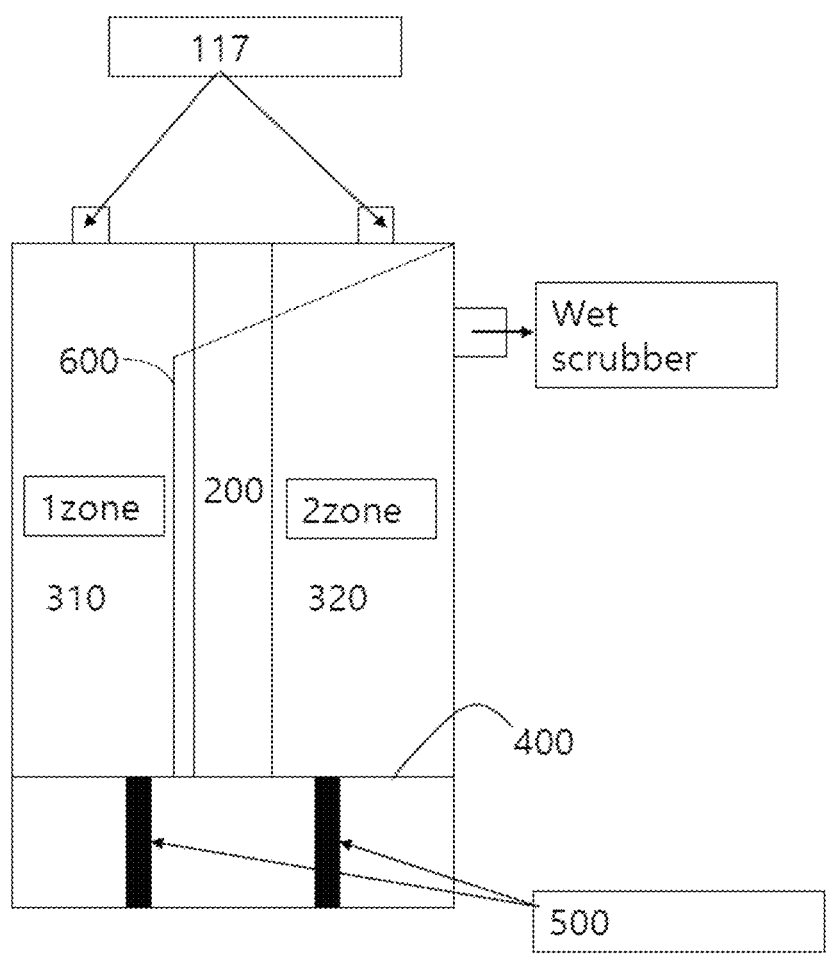
FIG. 4 is a cross-sectional view showing another modification of the thermal oxidation device of the present invention.

FIG. 4 shows an embodiment configured to be more advantageous to the reaction in which the powder occurs in large quantities from the material to be treated.

With respect to the configuration of FIG. 3, a separation portion 600 is installed to separate the chamber into two parts, which are configured into a first zone 310 without a catalyst and a second zone 320 filled with the catalyst. The second zone 320 occupies more than the half of the volume of the chamber, including the portion where the heater 200 is arranged. The separation portion 600 includes a wall portion having a vertical component of separating the first zone and the second zone and the wall portion includes pores. The catalyst is stored in the second zone 320 by the separation portion 600 and the first zone 310 maintains an empty space. The lowest limit of the height of the separation portion is a height at which the catalyst is filled. Further, in the separation portion, a configuration of an interface for separating the first zone and the second zone is configured by an opening-shaped to mesh member up to a height at which the catalyst is filled, and the upper side thereof is configured by a closed surface to prevent the material from being discharged to the outlet without passing through the catalyst.

In FIG. 4, the separation portion is configured in the same manner as that the top of a cylinder is cut into a diagonal line and a part thereof is vertically cut. However, the separation portion may be formed in various forms as long as the separation portion is a partition wall with pores erected to separate the chamber space into a portion with the heater and a portion without the heater.

By this configuration, the introduced material to be treated reaches the bottom of the chamber and then most of the material is introduced to the first zone 310 which is the empty space and introduced to the second zone 320 with the catalyst while causing the reaction by the heater. That is, the path of the material to be treated first descends along the inlet 117 and then ascends to the first zone and proceeds to the second zone with a horizontal component. Accordingly, the longer the path of the material to be treated, the longer the residence time.

Further, in the first zone 310, the powder which has been already included in the material to be treated and the powder generated in the thermal oxidation reaction may be dropped and collected to the lower part of the first zone which is the empty space. That is, the powder is maximally removed in the first zone, and then the catalytic thermal oxidation reaction occurs in the second zone and the powder is discharged to the wet scrubber through the outlet formed in the chamber of the second zone side.

The powder generated in the second zone is dropped and collected by the impact member, and the impact member is a hollow tube member, and includes beads therein and an impact unit of applying the impact to the beads, and the powder present in the cartridge is dropped by movement of the beads.

Since the powder is removed from the first zone and the catalytic thermal oxidation occurs in the second zone, the efficiency of the thermal decomposition reaction is improved. Therefore, such a configuration is more advantageous for the reaction in which more powder is generated.

On the other hand, the specific numerical values presented in the embodiments are illustrative and can be modified as needed of course, and those skilled in the art to which the present invention pertains will appreciate that the present invention can be implemented in other specific forms without changing the technical spirit or essential features thereof. Therefore, it should be appreciated that the aforementioned embodiments are illustrative in all aspects and are not restricted. The scope of the present invention is represented by the appended claims to be described below rather than the detailed description, and it is to be interpreted that the meaning and scope of the appended claims and all changes or modifications derived from the equivalents thereof come within the scope of the present invention.

EXPLANATION OF REFERENCE NUMERALS AND SYMBOLS

| | |
|---|---|
| 100: Cartridge | 200: Heater |
| 300: Catalyst | 115, 117: Inlet |
| 110: Cartridge top | 120: Cartridge body |
| 117-1: Outlet | 10: First exhaust |
| 20: Wet tank | 30: Second exhaust |
| 210: Heater housing | 220: Double housing |
| 500: Impact member | |

What is claimed is:

1. A cartridge for a thermal oxidation device as a replaceable cartridge included in the thermal oxidation device for treating a material to be treated, the cartridge comprising:

a chamber-type body;

a heater provided in the chamber-type body;

a catalyst support bottom portion which supports a catalyst to fill the catalyst around the heater;

an inlet into which the material to be treated is introduced;

an outlet formed in the chamber-type body; and an impact member connected to the catalyst support bottom portion, wherein the catalyst support bottom portion is provided with a space from a cartridge bottom portion and has an opening through which the material to be treated may be introduced, the inlet starts from an upper part of the chamber-type body and extends to pass through the catalyst support bottom portion, and the material to be treated descends along the inlet to reach a space below the catalyst support bottom portion and then ascends through the opening of the catalyst support bottom portion, and is heated with the catalyst by the heater to be oxidized and then discharged through the outlet, the impact member is a hollow tube member, and includes a bead or beads therein and an impact unit of applying the impact to the bead or beads, and a powder present in the cartridge is dropped by movement of the bead or beads, and the impact unit is a hydraulic type to apply momentum to the bead or beads by using gas pressure.

2. A thermal oxidation device comprising:

the cartridge of claim 1;

a first exhaust connected to the outlet of the cartridge;

a wet tank which communicates with the first exhaust; and a second exhaust connected to the wet tank, wherein the first exhaust and the second exhaust are formed in pipes and include one or more nozzles in the pipe to perform a wet process.

3. The thermal oxidation device of claim 2, wherein the entire cartridge used is replaced with a new cartridge.

* * * * *